United States Patent Office.

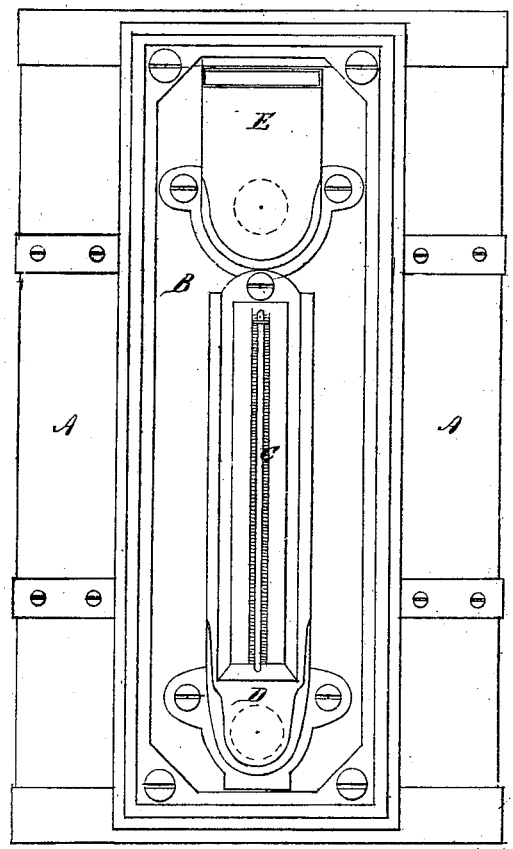

GEORGE N. PALMER, OF GREENE, NEW YORK.

Letters Patent No. 102,425, dated April 26, 1870.

IMPROVEMENT IN CHURNS.

The Schedule referred to in these Letters Patent and making part of the same.

To all whom it may concern:

Be it known that I, GEORGE N. PALMER, of Greene, in the county of Chenango and State of New York, have invented certain new and useful Improvements in Churns; and I do hereby declare that the following is a full, clear, and exact description thereof, reference being had to the accompanying drawings and to the letters of reference marked thereon, which form a part of this specification.

The nature of my invention consists in the mode of attaching a thermometer to a churn, so as to be able to tell the temperature of the cream at all times.

In order to enable others skilled in the art to which my invention appertains to make and use the same, I will now proceed to describe its construction and operation, referring to the annexed drawings, which show a side elevation of a churn with thermometer attached.

A represents a churn of any description, having an air-tight box, B, attached to its side, the front of said box being provided with a glass, or other transparent material.

Inside of this box is placed a thermometer, C, the bulb of which is inserted in a hole or opening leading into the churn, so that the cream will come in immediate contact with the same.

The lower end of the thermometer is within the box B protected by a guard, D, so constructed that no cream can escape from the churn into the air-chamber or box B.

The guard D, with the bulb-opening in the side of the churn, forms a conical-shaped chamber, giving free access for the cream to flow in and out around the bulb of the thermometer.

At the top of the thermometer I have attached an air-conductor, E, to supply the air-chamber B with air from the inside of the churn, so that the temperature of the air in both will be the same.

In using the thermometer without the air-chamber B, it is found that the thermometer would not denote the exact temperature of the cream. For instance, if the temperature of the cream was 62°, and the air surrounding the churn at 70°, the tube of the thermometer would be effected in such a manner as not to indicate the true temperature of the cream.

The air-chamber B obviates this difficulty by giving the temperature of the cream to the tube on the outside of the churn as well as to the bulb on the inside.

Having thus fully described my invention,

What I claim as new, and desire to secure by Letters Patent, is—

1. The air-conductor E, for the purpose of giving the air-chamber B the same temperature as the inside of the churn, substantially as herein set forth.

2. The conical-shaped bulb, chamber, or guard D, to give free access for the cream to flow in and out, substantially as herein set forth.

3. The air-chamber B, in combination with the bulb-chamber D, and air-conductor E, all substantially as and for the purposes herein set forth.

In testimony that I claim the foregoing as my own, I affix my signature in presence of two witnesses.

GEO. N. PALMER.

Witnesses:
   H. R. BIRDSALL,
   C. A. WHEELER.